United States Patent
Salazar-Salas et al.

(10) Patent No.: US 12,209,692 B2
(45) Date of Patent: Jan. 28, 2025

(54) SEALING A PUMP

(71) Applicant: PSG CALIFORNIA LLC, Grand Terrace, CA (US)

(72) Inventors: Jose Eduardo Salazar-Salas, Ontario (CA); Leonard Galvan, Riverside, CA (US)

(73) Assignee: PSG CALIFORNIA LLC, Grand Terrace, CA (US)

( * ) Notice: Subject to any disclaimer, the term of this patent is extended or adjusted under 35 U.S.C. 154(b) by 0 days.

(21) Appl. No.: 18/305,968

(22) Filed: Apr. 24, 2023

(65) Prior Publication Data

US 2024/0353035 A1    Oct. 24, 2024

(51) Int. Cl.
  *F04B 53/22*   (2006.01)
  *F16L 21/06*   (2006.01)

(52) U.S. Cl.
  CPC ............ *F16L 21/065* (2013.01); *F04B 53/22* (2013.01)

(58) Field of Classification Search
  CPC ......... F16L 21/065; F16L 21/06; F16L 23/08; F16L 23/10
  See application file for complete search history.

(56) References Cited

U.S. PATENT DOCUMENTS

| | | |
|---|---|---|
| 2,599,882 A | 6/1952 | Adams |
| 2,977,995 A | 4/1961 | Walpole |
| 3,059,947 A * | 10/1962 | Felburg .................... F16L 23/08 285/410 |
| 3,134,155 A | 5/1964 | Kreidel et al. |
| 3,464,722 A * | 9/1969 | Larkin .................... F16L 23/10 24/284 |
| 3,905,623 A | 9/1975 | Cassel |
| 4,813,720 A | 3/1989 | Cassel |
| 6,062,610 A | 5/2000 | Andersson et al. |
| 6,877,191 B2 | 4/2005 | Logan et al. |
| 7,717,479 B2 | 5/2010 | Lebo et al. |
| 9,568,130 B2 | 2/2017 | Henrich et al. |
| 10,274,115 B2 | 4/2019 | Beagen et al. |

(Continued)

FOREIGN PATENT DOCUMENTS

DE       1226840 B  * 10/1966
DE      3504978 A1  *  8/1986

(Continued)

*Primary Examiner* — Zachary T Dragicevich
*Assistant Examiner* — James A Linford
(74) *Attorney, Agent, or Firm* — Fish & Richardson P.C.

(57) ABSTRACT

A clamp band assembly. The assembly includes a semi-circular band with a concave inner surface shaped to mate with the pump and a convex outer surface. Each semicircular band has a coupling mechanism and a fastener for tightening the assembly. The coupling mechanism is attached at each end of the semi-circular band. The coupling mechanism has a saddle shape to mate with a curved surface of half-barrel nuts. The opposing ends are attached to the convex outer surface and have a curved profile that matches a curvature of the convex outer surface of the semi-circular band. A void is formed between the coupling mechanism and the convex outer surface. The fastener passes through the void of opposing coupling mechanisms and couples with the half-barrel nuts, applying a coupling force to each of the opposing coupling mechanisms and tightening the assembly.

23 Claims, 9 Drawing Sheets

(56) References Cited

U.S. PATENT DOCUMENTS

| | | | |
|---|---|---|---|
| 2002/0033126 A1* | 3/2002 | Tolkoff | F42B 19/005 |
| | | | 114/20.1 |
| 2005/0082831 A1* | 4/2005 | Borland | F16L 21/04 |
| | | | 285/369 |
| 2012/0145270 A1 | 6/2012 | Krausz et al. | |
| 2020/0049285 A1 | 2/2020 | Lee | |
| 2022/0282720 A1 | 9/2022 | Foster et al. | |

FOREIGN PATENT DOCUMENTS

| | | | | |
|---|---|---|---|---|
| DE | 3843738 | A1 * | 7/1989 | |
| DE | 3942284 | C1 * | 2/1991 | |
| DE | 10122647 | C1 * | 4/2002 | F16L 21/065 |
| EP | 1243838 | A1 * | 9/2002 | F16L 21/065 |
| WO | WO-9830463 | A1 * | 7/1998 | F16L 23/08 |

* cited by examiner

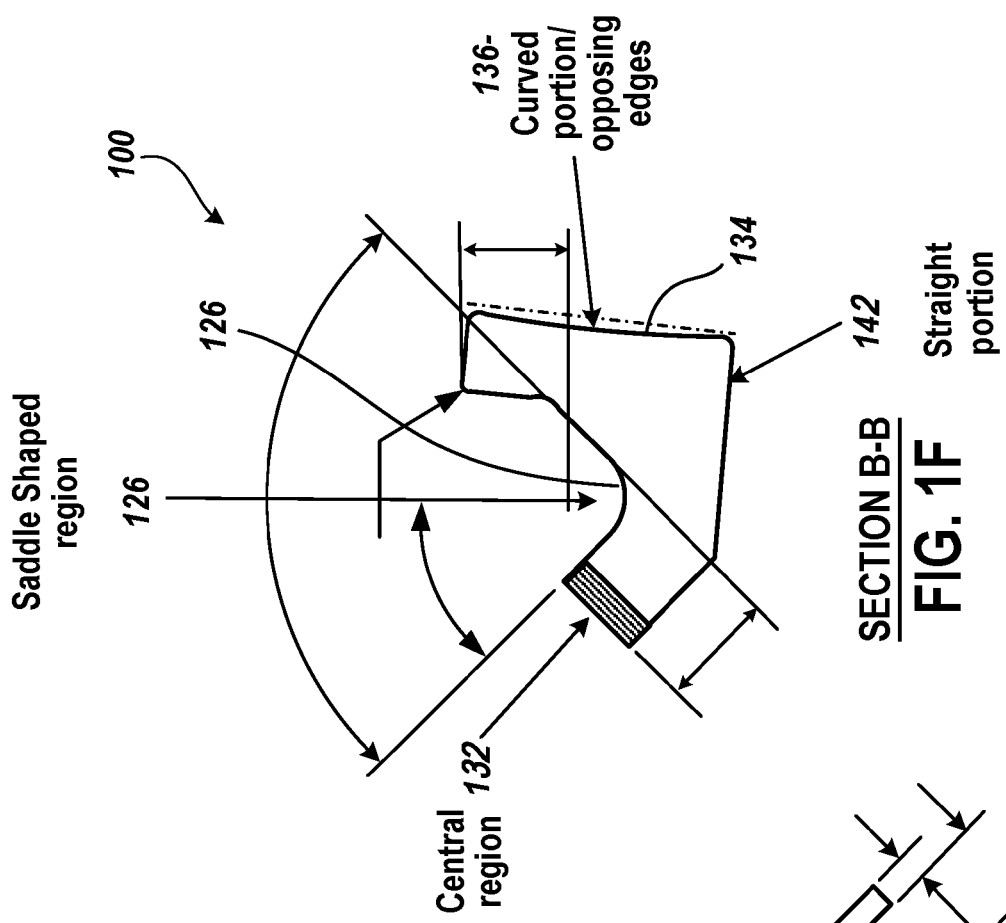
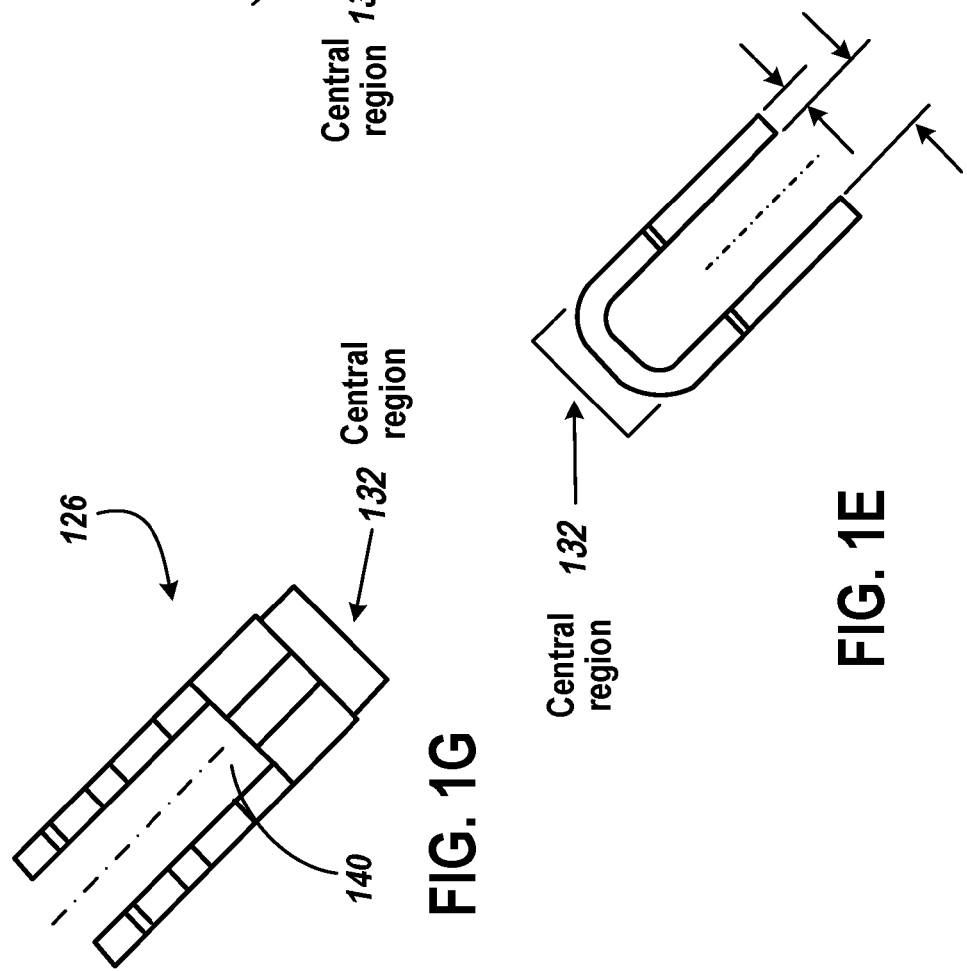

SECTION C-C

SECTION D-D

SECTION A-A

SEALING A PUMP

TECHNICAL FIELD

This disclosure relates to sealing a pump, in particular, one with a pump body and an end cap by tightening a clamp band assembly about the pump body and the end cap.

BACKGROUND

Pumps pressurize fluids and flow fluids from one location to another location. Some pumps, like diaphragm pumps, have a pump body and an end cap sealing the pump body. In some cases, the seal between the pump body and the end cap fails, leaking fluids within the pump body outside the pump body or allowing fluid and debris from outside the pump body to ingress into the pump body.

SUMMARY

This disclosure describes systems and methods related to sealing a pump with a clamp band assembly. The pump has a pump body and an end cap. This approach positions the clamp band assembly about the pump body and the end cap and tightens the clamp band assembly to seal the pump.

In one aspect, a clamp band assembly includes at least one semi-circular band having a coupling mechanism attached at each end of the semi-circular band and at least one fastener for tightening the clamp band assembly. The at least one semi-circular band has a concave inner surface and a convex outer surface. The concave inner surface is shaped to mate with a pump. The coupling mechanism is attached at each end of the semi-circular band. The coupling mechanism has a saddle shape to mate with a curved surface of a half-barrel nut. The coupling mechanism is formed of a single sheet of material. The sheet is bent proximate to a central section of the sheet such that opposing ends of the sheet align parallel with one another. The opposing ends are attached to the convex outer surface and have a curved profile that matches a curvature of the convex outer surface of the semi-circular band. A void is formed between the coupling mechanism and the convex outer surface. The at least one fastener is sized to pass through the void of two opposing coupling mechanisms and couples with a half-barrel nut on each end of the fastener, thereby applying a coupling force to each of the opposing coupling mechanisms and tightening the clamp band assembly.

In some embodiments, the coupling mechanism further includes a straight portion opposite the saddle shape to mate with another straight portion of the opposing coupling mechanism. In some cases, the straight portions of two opposing coupling mechanisms move toward each other responsive to tightening the clamp band.

In some embodiments, the saddle shape mates with the curved surface of the half-barrel nut. The saddle shape has a first portion and a second portion. The second portion is spaced apart from the first portion by the void. In some cases, the fastener is positioned between the first portion and the second portion. In some cases, the curved surface of the half-barrel nut slides relative to the first portion and the second portion of the saddle shape responsive to tightening the clamp band assembly.

In some embodiments, the half-barrel nut further includes a flat surface coupled to the curved surface. In some cases, the half-barrel nut is coupled to one of the opposing coupling mechanisms and further includes a threaded void extending from the curved surface to the flat surface. The threaded void accepts threads of the fastener.

In some cases, the half-barrel nut is coupled to the other of the opposing coupling mechanisms and further includes a smooth void extending from the curved surface to the flat surface. The smooth void allows threads of the fastener to pass. Sometimes, the threaded void and the smooth void each define a respective longitudinal axis. The fastener defines a longitudinal axis. The respective longitudinal axes of the threaded void and the smooth void are aligned to the longitudinal axis of the fastener responsive to tightening the clamp band.

In some embodiments, the clamp band assembly further includes a washer having a first planar surface of a first circumference and a second planar surface of a second circumference. The first circumference is greater than the second circumference. The first planar surface is parallel to the second planar surface. The washer is coupled to the fastener.

In some cases, the first planar surface of the washer couples to the flat surface of the half-barrel nut and the second planar surface of the washer couples to a head of the fastener. Sometimes, the washer further includes a side surface coupling the first planar surface to the second planar surface. A portion of the side surface is rounded. Sometimes, an edge connecting an inner surface of the washer to the first planar surface is chamfered.

In another aspect, a clamp assembly includes a first bracket and a second bracket. The first bracket has a first semi-circular band and a first coupling mechanism attached at each end of the first semi-circular band. The first semi-circular band having a concave inner surface and a convex outer surface. The first coupling mechanism is attached at each end of the first semi-circular band. The first coupling mechanism has a saddle shape to mate with a curved surface of a half-barrel nut. The first coupling mechanism is formed of a first sheet of material bent proximate to a central section of the first sheet such that opposing ends of the first sheet align parallel with one another. The opposing ends are attached to the convex outer surface of the first semi-circular band and have a curved profile that matches a curvature of the convex outer surface of the first semi-circular band. A void is formed between the first coupling mechanism and the convex outer surface of the first semi-circular band. The second bracket has a second semi-circular band and a second coupling mechanism attached at each end of the second semi-circular band. The second semi-circular band has a concave inner surface and a convex outer surface. The second coupling mechanism is attached at each end of the second semi-circular band. The first coupling mechanism has a saddle shape to mate with a curved surface of a half-barrel nut. The second coupling mechanism is formed of a second sheet of material bent proximate to a central section of the second sheet such that opposing ends of the second sheet align parallel with one another. The opposing ends are attached to the convex outer surface of the second semi-circular band and have a curved profile that matches a curvature of the convex outer surface of the second semi-circular band. A void is formed between the second coupling mechanism and the convex outer surface of the second semi-circular band. The at least two fasteners are sized to pass through the voids of one first coupling mechanism and one second coupling mechanism and couple with a half-barrel nut on each end of the respective fastener, thereby applying a coupling force to each of the one first coupling mechanism and one second coupling mechanism and drawing the one first coupling mechanism and one second coupling mechanism together.

In yet another aspect, a method of manufacture a clamp assembly for coupling an end cap to a pump body includes obtaining a first semi-circular band having a concave inner surface and a convex outer surface; stamping a first coupling mechanism blank, the blank having a C-shaped interior profile and an outer profile with two straight sections and two curved sections, the curved sections having a curvature that approximates the convex outer surface of the semi-circular band; bending the coupling mechanism blank in at least one location proximate to a central region of the blank; aligning the curved sections are parallel to one another; responsive to aligning the curved sections parallel to one another, forming the coupling mechanism blank into a three-sided bracket; and fastening the three-sided bracket to one end of the semi-circular band by attaching the curved sections to the convex outer surface of the semi-circular band.

In some embodiments, the method further includes stamping a second coupling mechanism blank, the second blank having a second C-shaped interior profile and a second outer profile with two second straight sections and two second curved sections, the second curved sections having a second curvature that approximates the convex outer surface of the semi-circular band; bending the second coupling mechanism blank in at least one second region proximate to a second central region of the second blank; aligning the second curved sections are parallel to one another; responsive to aligning the second curved sections parallel to one another, forming the second coupling mechanism blank into a second three-sided bracket; and fastening the second three-sided bracket to another end of the semi-circular band by attaching the second curved sections to the convex outer surface of the semi-circular band.

In some embodiments, attaching the curved sections to the convex outer surface of the semi-circular band includes welding the curved sections to the convex outer surface of the semi-circular band.

In some embodiments, forming the coupling mechanism blank into the three sided bracket defines a saddle shape region on one of the three sides of the three-sided bracket.

In some embodiments, the method further includes forming a half-barrel nut to slide in the saddle shaped region responsive to tightening the clamp assembly. In some cases, forming the half-barrel nut includes obtaining a bar stock having an outer diameter corresponding to an inner diameter of the saddle shaped region; halving the bar stock; responsive to halving the bar stock, forming a length of semi-circular shaped bar stock having a curved portion and a flat portion; dividing the length of semi-circular shaped bar stock into sections, each section having a length corresponding to an outer dimension defined by an outer surfaces of the saddle shaped region; and boring a void from the flat portion to the curved portion. In some cases, the void is at least one of a threaded void or a smooth void.

In some embodiments, the method further includes obtaining washers; placing one washer proximate one half-barrel nut having the threaded void in the saddle shaped region of one coupling mechanism; placing another washer proximate one half-barrel nut having the smooth void in the saddle shaped region of the another coupling mechanism; passing a fastener through the one washer and the half-barrel nut having the smooth void in the saddle shaped region; passing the fastener through the other washer; threading the fastener into the half-barrel nut having the threaded void in the saddle shaped region; responsive to threading the fastener into the half-barrel nut having the threaded void in the saddle shaped region, the clamp assembly placed about the end cap positioned on an end of the pump body, tightening the clamp assembly; and responsive to tightening the clamp assembly, sealing the end cap to the pump body.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 1C-1G are perspective views of the coupling mechanism of FIG. 1B.

DETAILED DESCRIPTION

The present disclosure relates to sealing a pump with a clamp band assembly. The pump has a pump body and an end cap. This approach positions the clamp band assembly about the pump body and the end cap and tightens the clamp band assembly to seal the pump. The clamp band assembly has at least one semi-circular band, a coupling mechanism attached at each end of the semi-circular band, and at least one fastener sized to pass through two opposing coupling mechanisms and couple with a half-barrel nut on each end of the fastener.

The semi-circular band has a concave inner surface and a convex outer surface. The concave inner surface is shaped to mate with the pump. Specifically, the semi-circular band mates to a rim of the end cap and a flange extending from the pump body.

One coupling mechanism is attached at each end of the semi-circular band. The coupling mechanism has a saddle shape configured to mate with a curved surface of a half-barrel nut. The coupling mechanism is formed of a single sheet of material. The sheet is bent proximate to a central section of the sheet such that opposing ends of the sheet align parallel with one another. The opposing ends are attached to the convex outer surface of the semi-circular band. The opposing ends have a curved profile that matches a curvature of the convex outer surface of the semi-circular band. Bending the sheet proximate to the central section such that the opposing ends of the sheet align parallel with one another forms a void which is further defined between the coupling mechanism and the convex outer surface.

The fastener is sized to pass through the void of two opposing coupling mechanisms and couple with a half-barrel nut on each end of the fastener. Passing the fastener through the voids and coupling the fastener to the half-barrel nut applies a coupling force to each of the opposing coupling mechanisms and tightens the clamp band assembly.

Figure 1A:
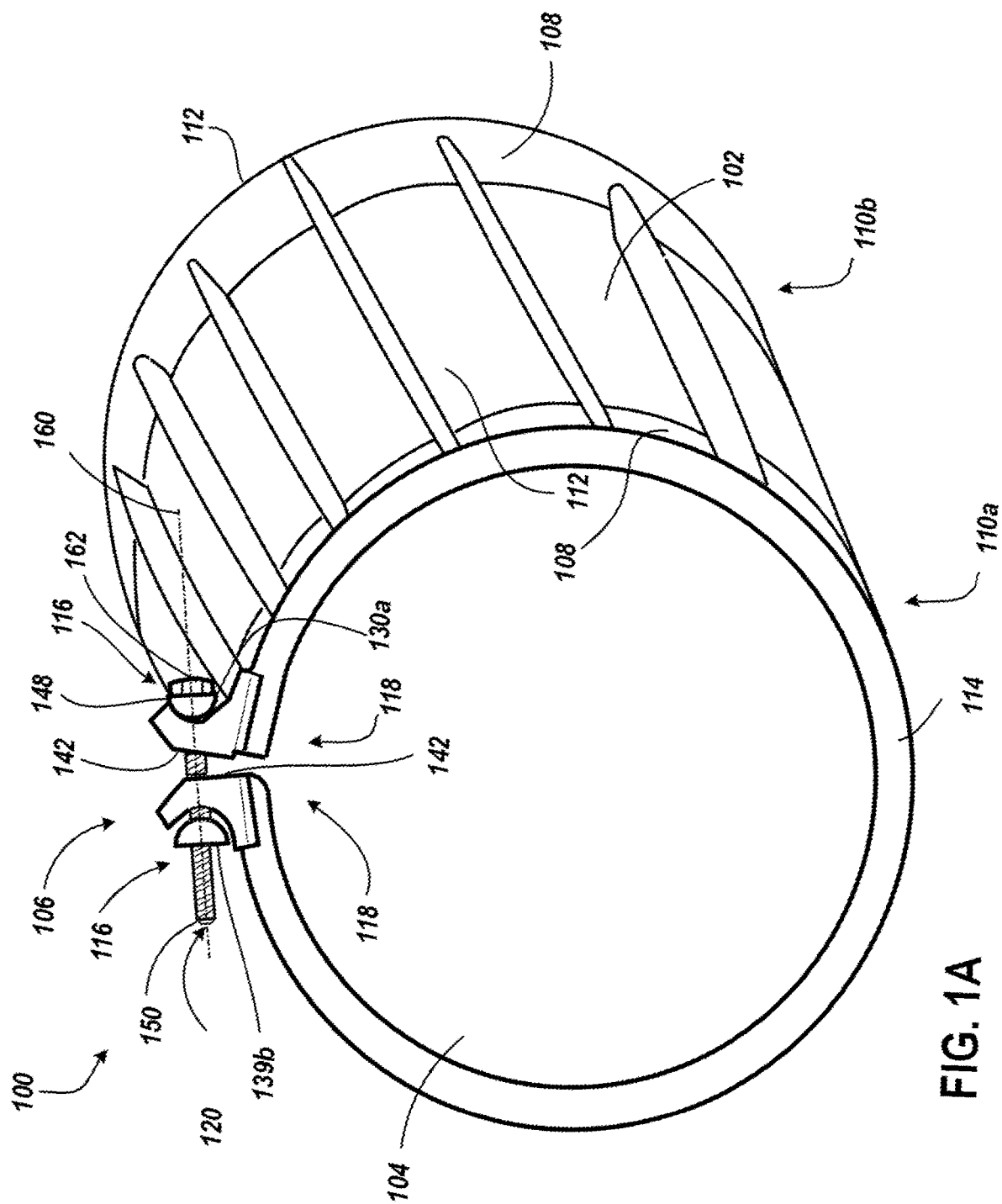
FIG. 1A is a perspective view of a clamp band assembly coupled to and sealing a pump.

FIG. 1A is a perspective view of a clamp band assembly coupled to and sealing a pump according to the implementations of the present disclosure. In some implementations, the clamp band assembly can be referred to as a clamp assembly. A pump 100 has as pump body 102 and an end cap 104 which are fastened together by a clamp band assembly 106 to seal the pump 100. The pump body 102 has flanges 108 on opposite ends 110a, 110b of the pump body 102. The end cap 104 has a rim 112 extending around the end cap 104 and sized to fit about the flange 108. The clamp band assembly 106 engages the one of the flanges 108 and one of the rims 112 and tightens about the rim 112 and the flange 108 to seal the pump 100. The clamp band assembly 106 has a fastener 120 which can be rotated to tighten or loosen the clamp band assembly 106 about the rim 112 and the flange 108.

Figure 2:
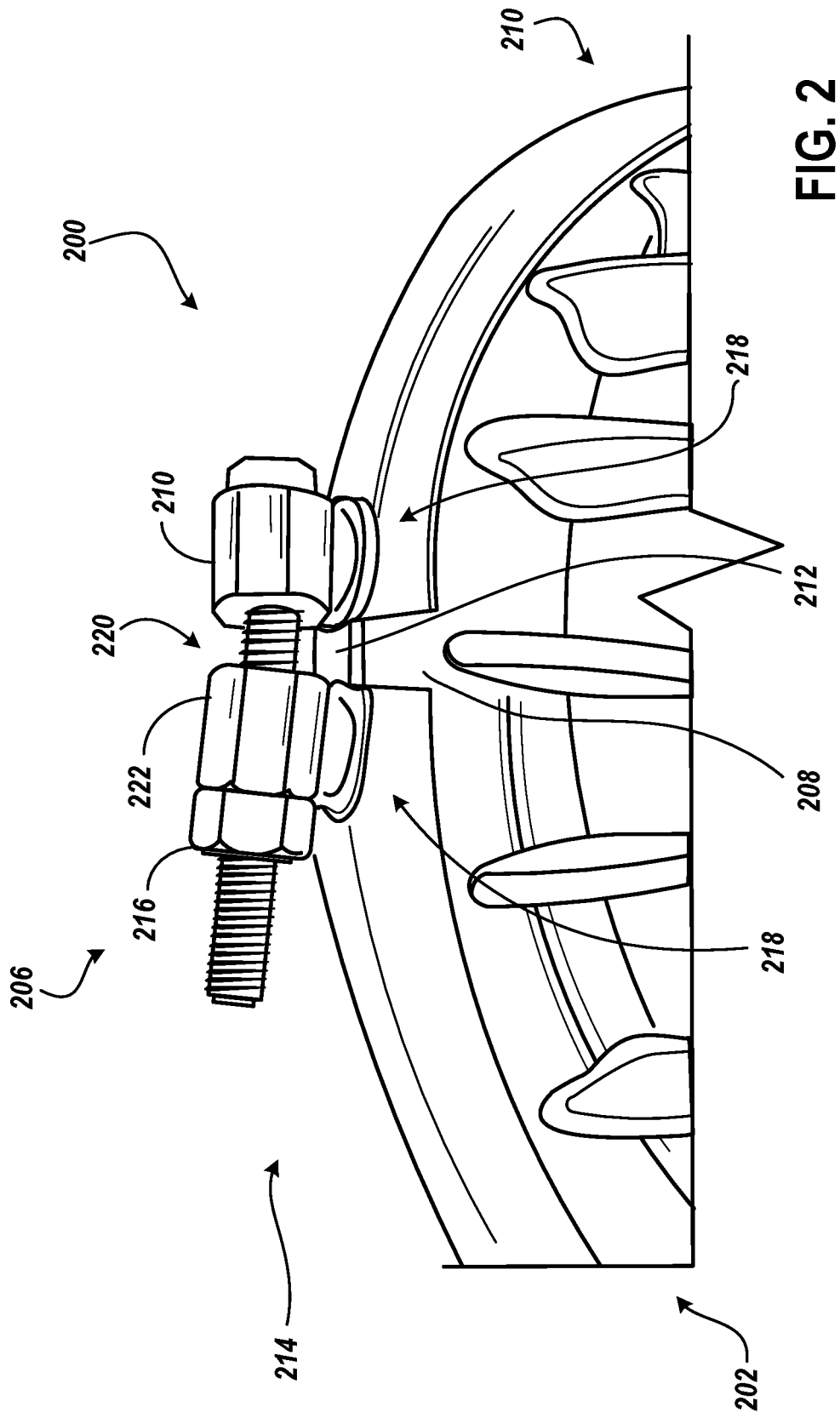
FIG. 2 is an example of a conventional clamp band assembly tightened about a pump with a fastener of the clamp band assembly bent responsive to tightening the clamp band assembly.

FIG. 2 is an example of conventional clamp band assembly tightened about a pump with a fastener of the conventional clamp band assembly bent responsive to tightening the conventional clamp band assembly. Pump 200 has as pump body 202 and an end cap (not shown) which are fastened together by a conventional clamp band assembly 206 to seal the pump 200. Pump 200 is substantially similar to pump 100. Pump 200 has a pump body 202 with flanges 208 on opposite ends 210 (one end shown) of the pump body 202. The end cap 204 has a rim 212 extending around the end cap and sized to fit about the flange 208. The conventional clamp band assembly 206 engages the one of the flanges 208 and one of the rims 212 and tightens about the rim 212 and the flange 208 to seal the pump 200.

The conventional clamp band assembly 206 includes a semi-circular band 214, two cylinders 222 coupled to each opposing end 218 of the semi-circular band 214, a bolt 220 passing through the two cylinders 222, and a nut 216 threaded to the bolt 220. Rotating one of the nut 216 or the bolt 220 and preventing the other of the nut 216 or the bolt 220 from rotating can loosen or tighten the conventional clamp band assembly 206 depending on the direction of rotation. Tightening the conventional clamp band assembly 206 imparts rotation forces on the bolt 220 and bends the bolt 220. Bending the bolt 220 can damage the seal or prevent the disassembly of the conventional clamp band assembly 206. In contrast, tightening the clamp band assembly 106 according to the implementations of the present disclosure imparts linear forces on the fastener 120.

Implementations of the present disclosure can realize one or more of the following advantages. These systems and methods can reduce damage to pump components. For example, wear, bending, and torsion of fasteners such as bolts and nuts can be reduced, reducing damage to pump components.

These systems and methods can reduce total pump maintenance time. For example, since bolts of clamp band assemblies are no longer bent, they do not require cutting to remove the clamp band assembly from the pump to perform corrective or preventive maintenance on internal pump components.

These systems and methods can reduce or eliminate leakage of a fluid within the pump to a space outside the pump. For example, when a space between the end cap and the pump body cannot be sealed because a fastener of a clamp band assembly is bent, fluids within the pump can leak outside the pump. Tightening the clamp band assembly with the saddle shape mated with the curved surface of the half-barrel nut can allow the clamp band to tighten while maintaining the fastener in a straight condition, sealing the end cap to the pump body and preventing or eliminating fluid leaking from the pump body to the space outside the pump body.

These systems and methods can reduce or eliminate ingress of a fluid or a debris outside the pump into the pump body. For example, when a space between the end cap and the pump body cannot be sealed because a fastener of a clamp band assembly is bent, fluid or debris outside the pump can ingress into the pump. Tightening the clamp band assembly with the saddle shape mated with the curved surface of the half-barrel nut can allow the clamp band to tighten while maintaining the fastener in a straight condition, sealing the end cap to the pump body and preventing or eliminating fluid or debris from ingressing into the pump body.

These systems and methods can increase pump life. For example, preventing or eliminating fluids from leaking out of, and fluids and debris from ingressing into the pump can reduce damage to various pump components, such as thermal damage from a loss of fluid or mechanical damage from wear or abrasion, thus increasing pump life.

Referring to FIG. 1A, the clamp band assembly 106 has at least one semi-circular band 114, a coupling mechanism 116 attached at each end 118 of the semi-circular band 114, and at least one fastener 120 extending through and coupling the coupling mechanisms 116 together. Coupling the coupling mechanisms 116 together by the fastener 120 applies a coupling force to each of the opposing coupling mechanisms 116 and tightens the clamp band assembly 106 about the pump 100.

Figure 1B:
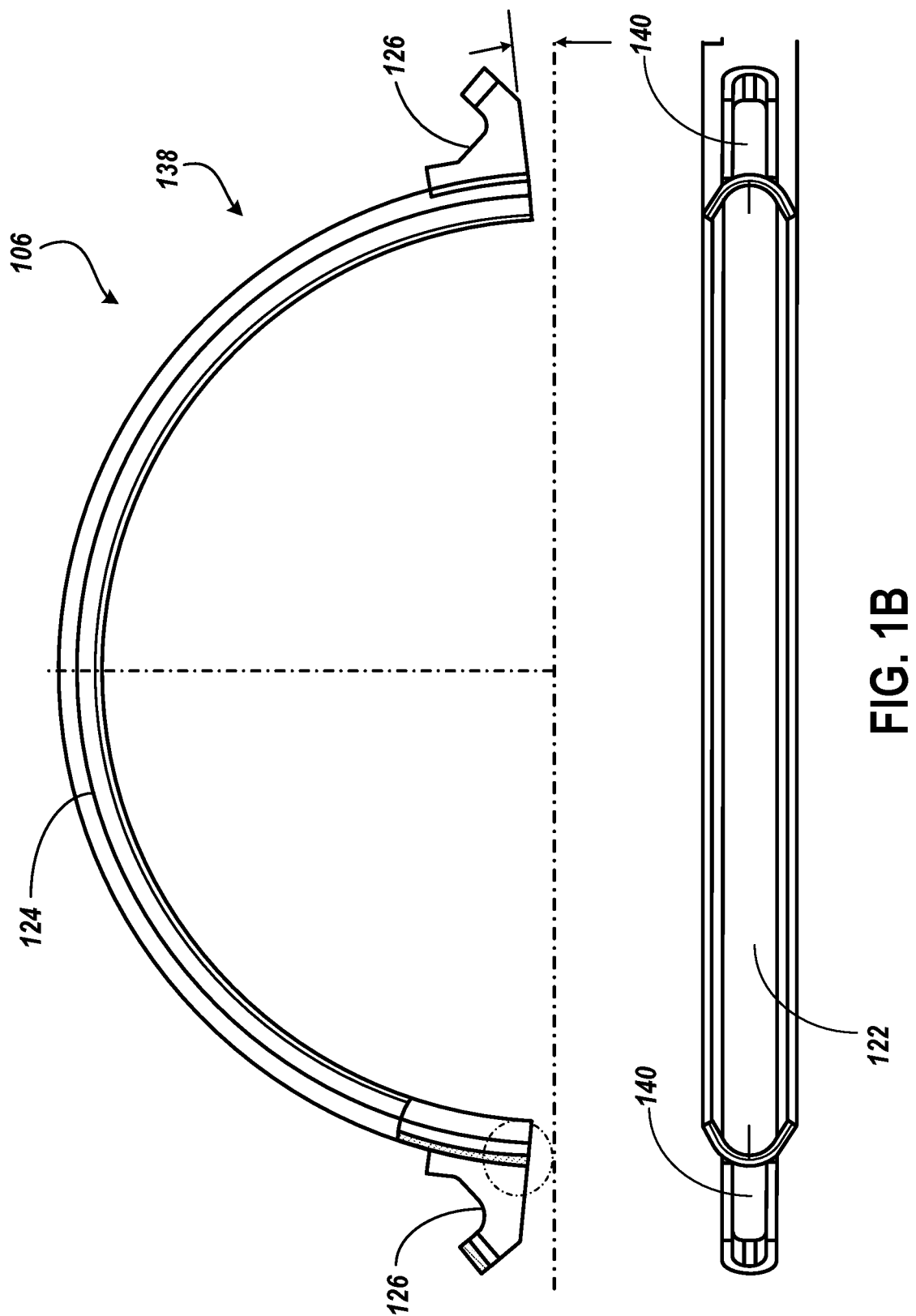
FIG. 1B is a schematic view of a semi-circular band and a coupling mechanism of the clamp band assembly of FIG. 1A.
Figure 1D:
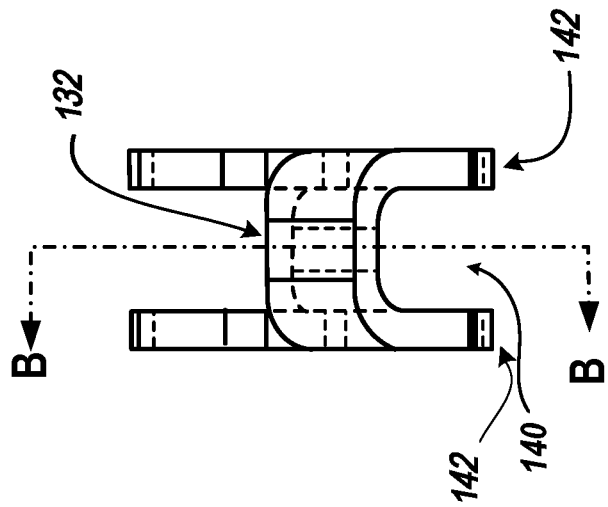
Figure 1C:
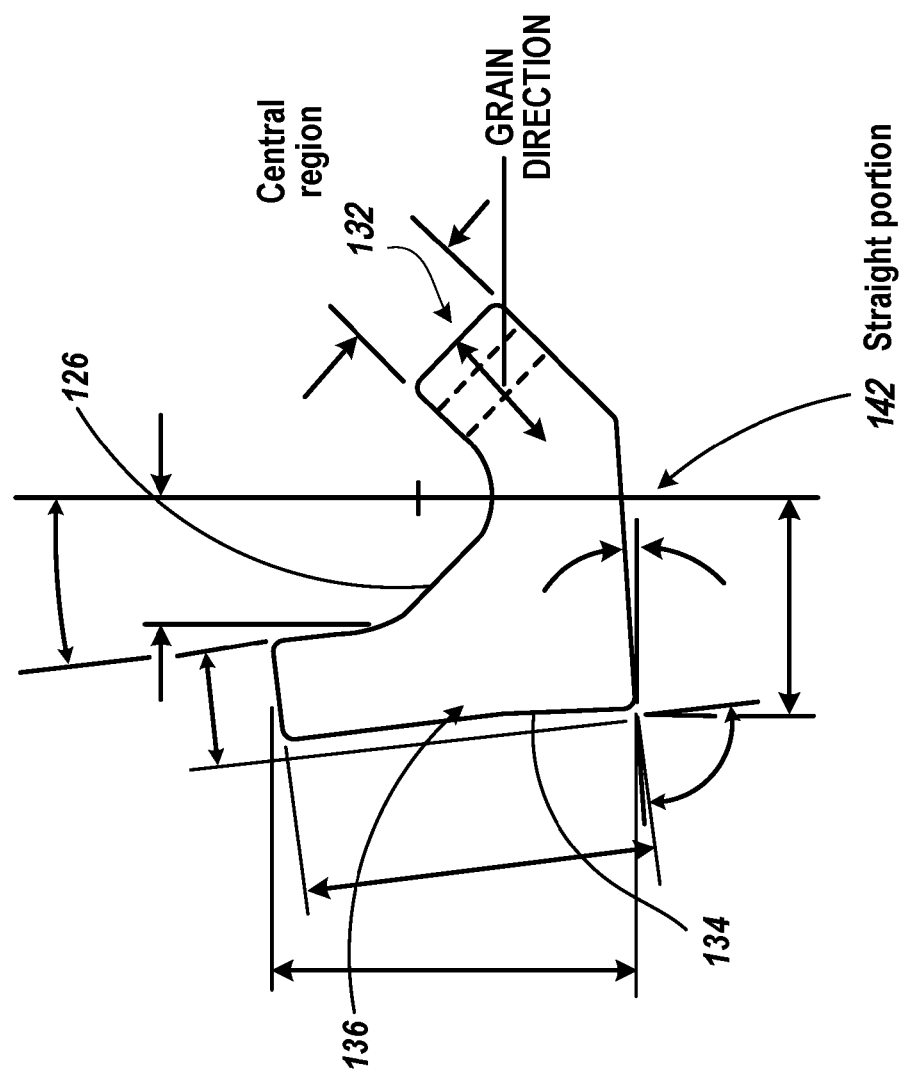
Figure 1H:
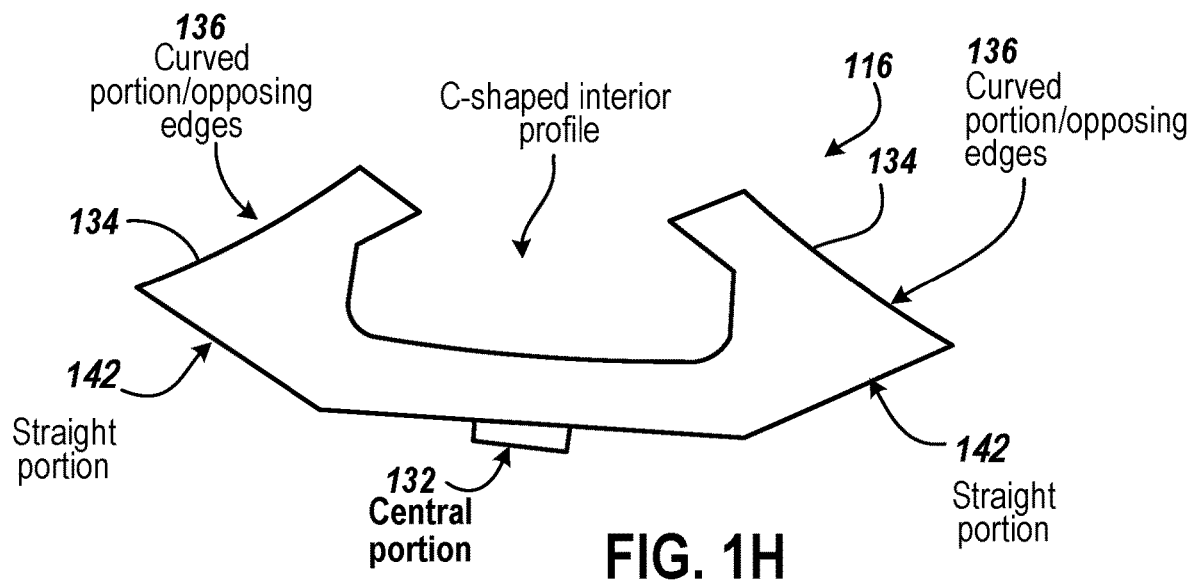
FIG. 1H is a perspective view of a blank used to form the coupling mechanism of FIG. 1B.
Figure 1I:
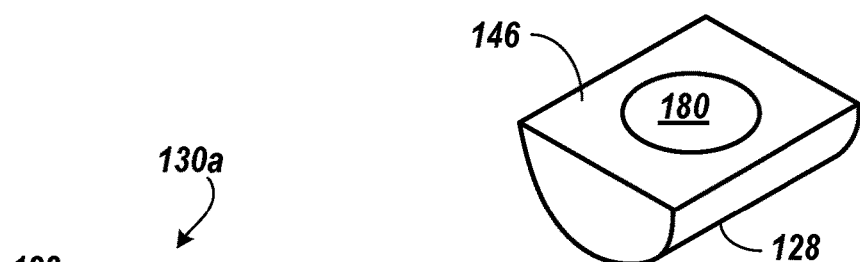
FIGS. 1I-1L are perspective views of a half-barrel nut with a smooth void of the clamp band assembly of FIG. 1A.
Figure 1J:
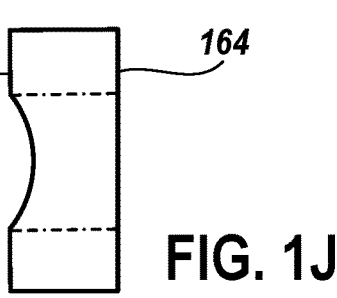
Figure 1K:
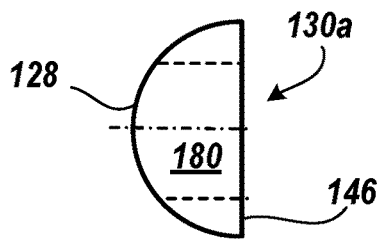
Figure 1L:
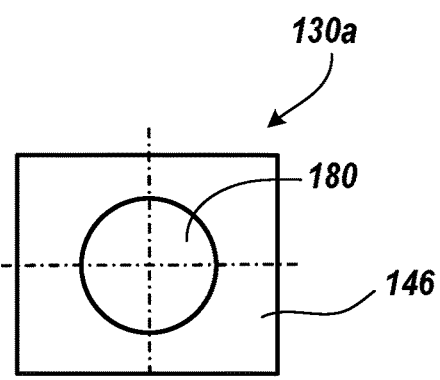
Figure 1M:
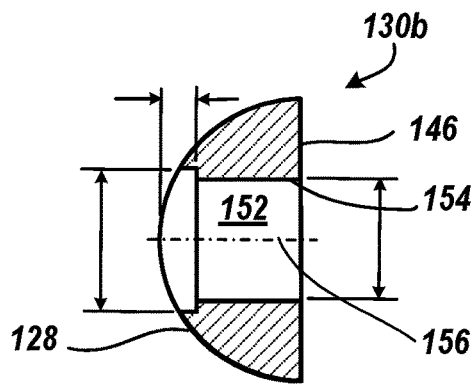
FIGS. 1M-1N are perspective views of a half-barrel nut with a threaded void of the clamp band assembly of FIG. 1A.
Figure 1N:
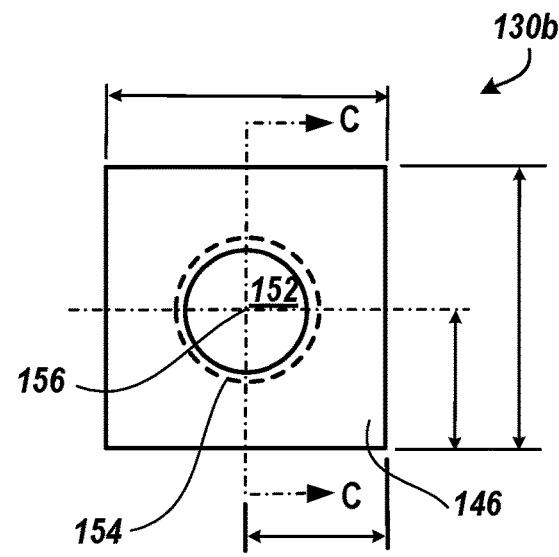
Figure 1O:
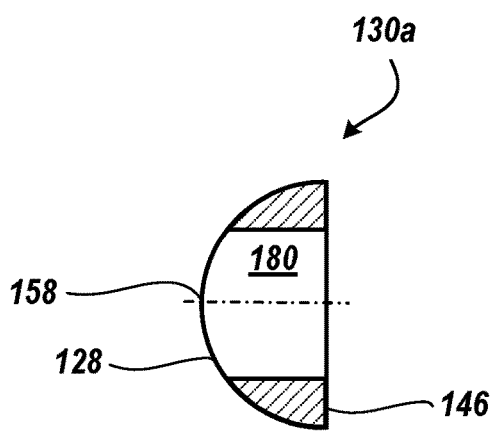
FIGS. 1O-1P are additional perspective views of the half-barrel nut with the smooth void of FIG. 1I-1L.
Figure 1P:
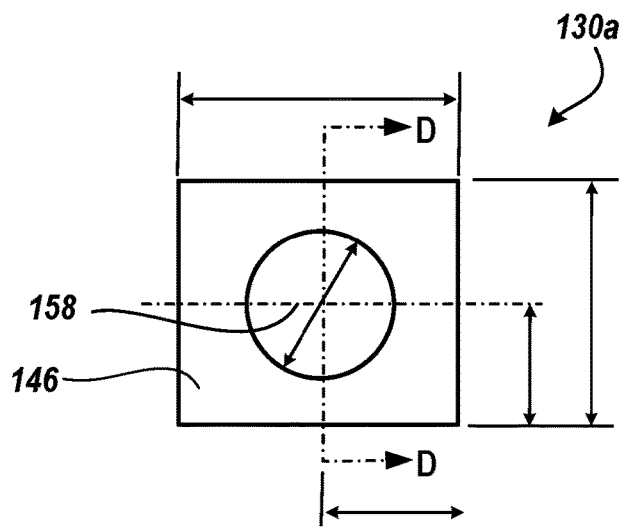
Figure 1S:
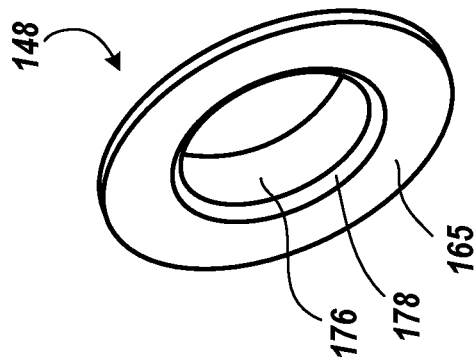
FIGS. 1Q-1S are perspective views of a washer of the clamp band assembly of FIG. 1A.

FIGS. 1B-1S are perspective views of various features of the clamp band assembly 106 shown in FIG. 1A. Referring to FIGS. 1A-1B, the semi-circular band 114 has a concave inner surface 122 and a convex outer surface 124. The concave inner surface 122 is shaped to mate with the rim 112 of the end cap 104 and the flange 108 of the pump body 102.

Referring to FIGS. 1A-1H, the coupling mechanism 116 is attached at each end 118 of the semi-circular band 114. The coupling mechanism 116 has a saddle shape 126 configured to mate with a curved surface 128 of a half-barrel nut 130a, 130b (described in more detail in reference to FIGS. 1A and 1I-1P). Referring to FIG. 1H, the coupling mechanism 116 is formed of a single sheet of material. The sheet is bent proximate to a central section 132 of the sheet such that opposing ends 134 of the sheet align parallel with one another. Referring to FIGS. 1A-1H, the opposing ends 134 are attached to the convex outer surface 124 of the semi-circular band 114. The opposing ends 134 have a curved profile 136 that matches a curvature 138 of the convex outer surface 124 of the semi-circular band 114. A void 140 is formed between the coupling mechanism 116 and the convex outer surface 124.

The coupling mechanism 116 has a straight portion 142 opposite the saddle shape 126. The straight portion 142 is configured to mate with the opposing straight portion 142 from the opposite coupling mechanism 116. The straight portions 142 of two opposing coupling mechanisms 116 move toward each other responsive to tightening the clamp band assembly 106.

The saddle shape 126 is configured to mate with the curved surface 128 of the half-barrel nut 130a, 130b. The saddle shape 126 has a first portion 144a and a second portion 144b. The second portion 144b is spaced apart from the first portion 144a by the void 140. The first portion 144a and the second portion 144b allow the curved surface 128 of the half-barrel nut 130a, 130b to slide while the fastener 120 passes through the void 140 and the clamp band assembly 106 tightens.

The fastener 120 is sized to pass through the void 140 of two opposing coupling mechanisms 116 and couple with the half-barrel nut 130a, 130b on each end of the fastener 120, thereby applying a coupling force to each of the opposing coupling mechanisms 116 and tightening the clamp band assembly 106. The fastener 120 is positioned between the first portion 144a and the second portion 144b.

Referring to FIGS. 1A and 1I-1P, the clamp band assembly 106 includes one or more half-barrel nuts 130a, 130b (shown in FIG. 1A). There are two types of half-barrel nuts, a smooth half-barrel nut 130a, shown in FIGS. 1I-1L and 1O-1P, and a threaded half-barrel nut 130b, shown in FIGS. 1M-1N. The curved surface 128 of the half-barrel nut 130a, 130b slides relative to the first portion 144a and the second portion 144b of the saddle shape 126 responsive to tightening the clamp band assembly 106.

The half-barrel nut 130a, 130b has a flat surface 146 coupled to the curved surface 128. The flat surface 146 can receive a washer 148, described in reference to FIGS. 1Q-1S, or the fastener 120.

Referring to FIGS. 1I-1L and 1O-1P, the smooth half-barrel nut 130a has a smooth void 180 extending from the curved surface 128 to the flat surface 146. The smooth void 180 is sized and configured to allow threads 150 of the fastener 120 to pass, that is, the smooth void 180 may touch the threads 150 of the fastener 120, but the smooth void does not threadably engage the threads 150 of the fastener 120. The smooth half-barrel nut 130 can be coupled to one of the coupling mechanisms 116.

The threaded half-barrel nut 130b is coupled to the opposing (the other one of) coupling mechanism 116. The threaded half-barrel nut 130b has a threaded void 152 extending from the curved surface 128 to the flat surface 146. The threaded void 152 is has threads 154 to threadably accept the threads 150 of the fastener 120.

Each of the threaded void 152 and the smooth void 180 each define a longitudinal axis 156 and 158, respectively. The fastener 120 defines a longitudinal axis 160. The respective longitudinal axes 156 and 158 of the threaded void 152 and the smooth void 180 are aligned to the longitudinal axis 160 of the fastener 120 responsive to tightening the clamp band assembly 106.

Referring to FIGS. 1A and 1Q-1S, the washer 148 can be positioned on the flat surface 146 of the smooth half-barrel nut 130a between the smooth half-barrel nut 130a and a head 162 of the fastener 120. The washer 148 can reduce or prevent wear on the flat surface 146 of the smooth half-barrel nut 130a when the fastener 120 rotates to tighten the clamp band assembly 103.

Figure 1R:
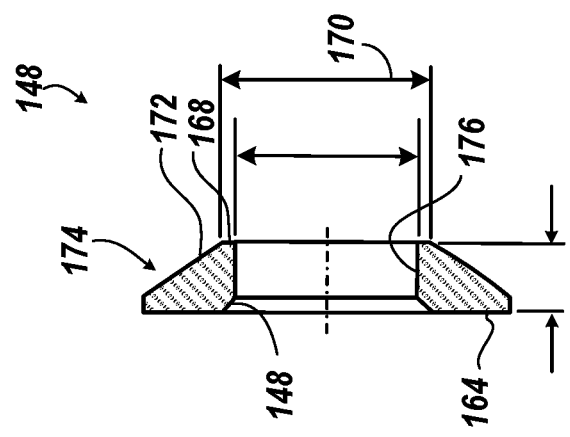
Figure 1Q:
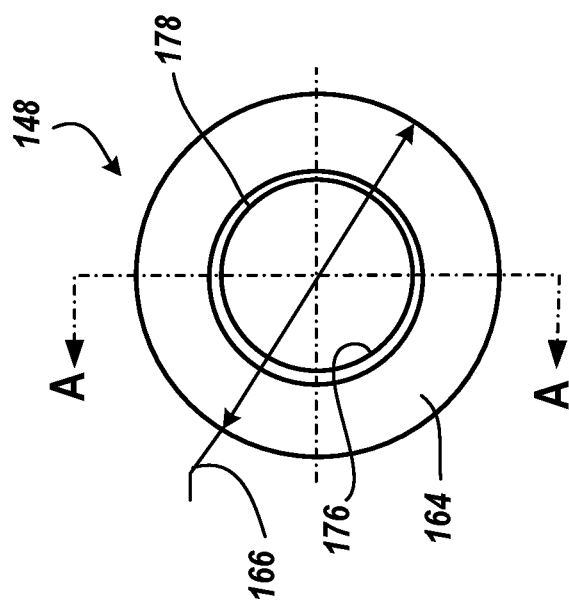

Referring to FIGS. 1Q-1S, the washer 148 has a first planar surface 164 of a first circumference 166 and a second planar surface 168 of a second circumference 170. The first circumference 166 can be greater than or equal to the second circumference 170. The first planar surface 164 can be parallel to the second planar surface 168. The first planar surface 164 of the washer 148 couples to the flat surface 146 of the smooth half-barrel nut 130a. The second planar surface 168 of the washer 148 couples to the head 162 of the fastener 120.

The washer 148 can include a side surface 172 coupling the first planar surface 164 to the second planar surface 168. In some cases, a portion 174 of the side surface 172 is rounded.

The washer 148 can include an inner surface 176. The inner surface 176 is smooth to allow the fastener 120 to pass.

The washer 148 can include an edge 178 connecting the inner surface 176 of the washer 148 to the first planar surface 164. In some cases, the edge 178 is chamfered. In other cases, the edge 178 is rounded.

Figure 3:
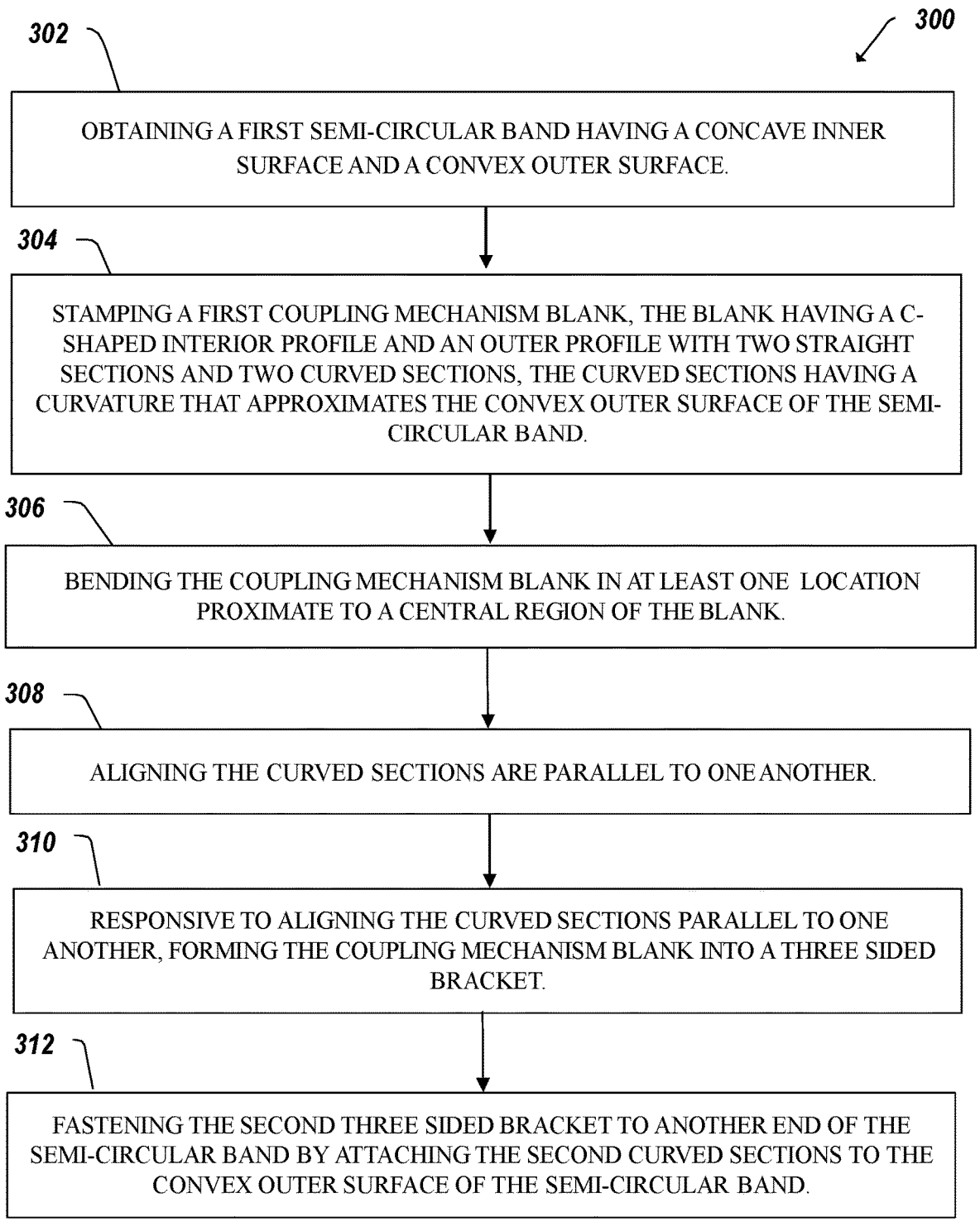
FIG. 3 is a flow chart of an example method of manufacturing a clamp band assembly according to the implementations of the present disclosure.

FIG. 3 is a flow chart of an example method of manufacturing a clamp band assembly according to the implementations of the present disclosure. The method manufactures a clamp band assembly for coupling an end cap to a pump body At 302, a first semi-circular band having a concave inner surface and a convex outer surface is obtained.

At 304, a first coupling mechanism blank is stamped. The blank has a C-shaped interior profile and an outer profile with two straight sections and two curved sections. The curved sections have a curvature that approximates the convex outer surface of the semi-circular band.

At 306, the coupling mechanism blank is bent in at least one location proximate to a central region of the blank.

At 308, the curved sections are aligned parallel to one another.

At 310, responsive to aligning the curved sections parallel to one another, the coupling mechanism blank is formed into a three-sided bracket. In some cases, forming the coupling mechanism blank into the three-sided bracket defines a saddle shape region on one of the three sides of the three-sided bracket.

At 312, the three-sided bracket is fastened to one end of the semi-circular band by attaching the curved sections to the convex outer surface of the semi-circular band. 18. In some cases, attaching the curved sections to the convex outer surface of the semi-circular band includes welding the curved sections to the convex outer surface of the semi-circular band.

Manufacturing the clamp band assembly can further include stamping a second coupling mechanism blank, the second blank comprising a second C-shaped interior profile and a second outer profile with two second straight sections and two second curved sections, the second curved sections having a second curvature that approximates the convex outer surface of the semi-circular band; bending the second coupling mechanism blank in at least one second region proximate to a second central region of the second blank; aligning the second curved sections are parallel to one another; responsive to aligning the second curved sections parallel to one another, forming the second coupling mechanism blank into a second three sided bracket; and fastening the second three sided bracket to another end of the semi-circular band by attaching the second curved sections to the convex outer surface of the semi-circular band.

Manufacturing the clamp band assembly can further include forming a half-barrel nut configured to slide in the saddle shaped region responsive to tightening the clamp band assembly. In some case forming the half-barrel nut includes obtaining a bar stock having an outer diameter corresponding to an inner diameter of the saddle shaped region; halving the bar stock; responsive to halving the bar stock, forming a length of semi-circular shaped bar stock having a curved portion and a flat portion; dividing the length of semi-circular shaped bar stock into sections, each section having a length corresponding to an outer dimension defined by an outer surfaces of the saddle shaped region; and boring a void from the flat portion to the curved portion. In some cases, the void is at least one of a threaded void or a smooth void.

Manufacturing the clamp band assembly can further include obtaining multiple washers; placing one washer proximate one half-barrel nut having the threaded void in the saddle shaped region of one coupling mechanism; placing another washer proximate one half-barrel nut having the smooth void in the saddle shaped region of the another coupling mechanism; passing a fastener through the one washer and the half-barrel nut having the smooth void in the saddle shaped region; passing the fastener through the other washer; threading the fastener into the half-barrel nut having the threaded void in the saddle shaped region; responsive to threading the fastener into the half-barrel nut having the threaded void in the saddle shaped region, the clamp band assembly placed about the end cap positioned on an end of the pump body, tightening the clamp band assembly; and responsive to tightening the clamp band assembly, sealing the end cap to the pump body.

The clamp band assembly can seal an end cap to a pump body by mating a semi-circular band having a coupling mechanism attached at each end of the semi-circular band to a rim of the end cap and a flange of the pump body; placing a washer on a fastener; placing a smooth half-barrel nut with a flat surface of the smooth half-barrel nut next to the washer; passing the fastener through one of the coupling mechanisms to contact a curved surface of the smooth half-barrel nut to a saddle shaped portion of one of the coupling mechanisms; positioning a threaded half-barrel nut in the other opposing coupling mechanism with a curved surface of the threaded half-barrel nut in the saddle shaped portion of the other opposing coupling mechanism; threading the fastener into the threaded half-barrel nut; tightening the clamp band assembly about the rim and the flange; and sealing the pump.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A clamp band assembly comprising:
   at least one semi-circular band having a concave inner surface and a convex outer surface, the concave inner surface shaped to mate with a pump, each semicircular band comprising:
   a coupling mechanism attached at each end of the at least one semi-circular band, the coupling mechanism having a saddle shape configured to mate with a curved surface of a half-barrel nut, the coupling mechanism formed of a single sheet of material, the single sheet bent proximate to a central section of the single sheet such that opposing ends of the single sheet align parallel with one another forming an arched section at the central section where the opposing ends join together, the opposing ends attached to the convex outer surface and comprising a curved profile that matches a curvature of the convex outer surface of the at least one semi-circular band, wherein a void is formed between the coupling mechanism and the convex outer surface, the opposing ends extending radial outwards from the at least one semi-circular band such that the void is bounded by the arched section, the opposing ends, and the at least one semi-circular band; and
   at least one fastener sized to pass through the void of two opposing coupling mechanisms and couple with a half-barrel nut on each end of the fastener, thereby applying a coupling force to each of the opposing coupling mechanisms and tightening the clamp band assembly.

2. The clamp band assembly of claim 1, wherein the coupling mechanism further comprises a straight portion opposite the saddle shape configured to mate with another straight portion of the opposing coupling mechanism.

3. The clamp band assembly of claim 2, wherein the straight portions of two opposing coupling mechanisms move toward each other responsive to tightening the clamp band assembly.

4. The clamp band assembly of claim 1, wherein the saddle shape configured to mate with the curved surface of the half-barrel nut comprises a first portion and a second portion, the second portion spaced apart from the first portion by the void.

5. The clamp band assembly of claim 4, wherein the at least one fastener is positioned between the first portion and the second portion.

6. The clamp band assembly of claim 4, wherein the curved surface of the half-barrel nut slides relative to the first portion and the second portion of the saddle shape responsive to tightening the clamp band assembly.

7. The clamp band assembly of claim 1, wherein the half-barrel nut further comprises a flat surface coupled to the curved surface.

8. The clamp band assembly of claim 7, wherein the half-barrel nut coupled to one of the opposing coupling mechanisms further comprises a threaded void extending from the curved surface to the flat surface, the threaded void configured to accept threads of the fastener.

9. The clamp band assembly of claim 8, wherein the half-barrel nut coupled to the other of the opposing coupling mechanisms further comprises a smooth void extending from the curved surface to the flat surface, the smooth void configured to allow threads of the fastener to pass.

10. The clamp band assembly of claim 9, wherein:
    the threaded void and the smooth void each define a respective longitudinal axis; and the fastener defines a longitudinal axis, the respective longitudinal axes of the threaded void and the smooth void are aligned to the longitudinal axis of the fastener responsive to tightening the clamp band.

11. The clamp band assembly of claim 10, further comprising a washer having a first planar surface of a first circumference and a second planar surface of a second circumference, the first circumference greater than the second circumference, the first planar surface parallel to the second planar surface, the washer coupled to the fastener.

12. The clamp band assembly of claim 11, wherein the first planar surface of the washer couples to the flat surface of the half-barrel nut and the second planar surface of the washer couples to a head of the fastener.

13. The clamp band assembly of claim 12, wherein the washer further comprises a side surface coupling the first planar surface to the second planar surface, wherein a portion of the side surface is rounded.

14. The clamp band assembly of claim 12, wherein an edge connecting an inner surface of the washer to the first planar surface is chamfered.

15. A clamp assembly comprising:
a first bracket comprising:
a first semi-circular band having a concave inner surface and a convex outer surface, and
a first coupling mechanism attached at each end of the first semi-circular band, the first coupling mechanism having a saddle shape configured to mate with a curved surface of a half-barrel nut, the first coupling mechanism formed of a first sheet of material bent proximate to a central section of the first sheet such that opposing ends of the first sheet align parallel with one another forming an arched section at the central section where the opposing ends join together, the opposing ends attached to the convex outer surface of the first semi-circular band and comprising a curved profile that matches a curvature of the convex outer surface of the first semi-circular band, wherein a void is formed between the first coupling mechanism and the convex outer surface of the first semi-circular band, the opposing ends extending radial outwards from the semi-circular band such that the void is bounded by the arched section, the opposing ends, and the semi-circular band;
a second bracket comprising:
a second semi-circular band having a concave inner surface and a convex outer surface, and
a second coupling mechanism attached at each end of the second semi-circular band, the first coupling mechanism having a saddle shape configured to mate with a curved surface of a half-barrel nut, the second coupling mechanism formed of a second sheet of material bent proximate to a central section of the second sheet such that opposing ends of the second sheet align parallel with one another forming an arched section at the central section where the opposing ends join together, the opposing ends attached to the convex outer surface of the second semi-circular band and comprising a curved profile that matches a curvature of the convex outer surface of the second semi-circular band, wherein a void is formed between the second coupling mechanism and the convex outer surface of the second semi-circular band, the opposing ends extending radial outwards from the semi-circular band such that the void is bounded by the arched section, the opposing ends, and the semi-circular band; and
at least two fasteners sized to pass through the voids of one first coupling mechanism and one second coupling mechanism and couple with a half-barrel nut on each end of the respective fastener, thereby applying a coupling force to each of the one first coupling mechanism and one second coupling mechanism and drawing the one first coupling mechanism and one second coupling mechanism together.

16. A method of manufacture a clamp assembly for coupling an end cap to a pump body, the method comprising:
obtaining a first semi-circular band having a concave inner surface and a convex outer surface;
stamping a first coupling mechanism blank, the blank comprising a C-shaped interior profile and an outer profile with two straight sections and two curved sections, the curved sections having a curvature that approximates the convex outer surface of the semi-circular band;
bending the coupling mechanism blank in at least one location proximate to a central region of the blank;
aligning the curved sections parallel to one another;
responsive to aligning the curved sections parallel to one another, forming the coupling mechanism blank into a three-sided bracket comprising a saddle shape configured to mate with a curved surface of a half-barrel nut, the coupling mechanism formed of a single sheet of material, the sheet bent proximate to a central section of the sheet such that opposing ends of the sheet align parallel with one another forming an arched section at the central region where the opposing ends join together, the opposing ends attached to the convex outer surface and comprising a curved profile that matches a curvature of the convex outer surface of the semi-circular band, wherein a void is formed between the coupling mechanism and the convex outer surface, the opposing ends extending radial outwards from the semi-circular band such that the void is bounded by the arched section, the opposing ends, and the semi-circular band; and
fastening the three-sided bracket to one end of the semi-circular band by attaching the curved sections to the convex outer surface of the semi-circular band.

17. The method of claim 16, further comprising:
stamping a second coupling mechanism blank, the second blank comprising a second C-shaped interior profile and a second outer profile with two second straight sections and two second curved sections, the second curved sections having a second curvature that approximates the convex outer surface of the semi-circular band;
bending the second coupling mechanism blank in at least one second region proximate to a second central region of the second blank;
aligning the second curved sections are parallel to one another;
responsive to aligning the second curved sections parallel to one another, forming the second coupling mechanism blank into a second three-sided bracket comprising a saddle shape configured to mate with a curved surface of a half-barrel nut, the coupling mechanism formed of a single sheet of material, the sheet bent proximate to a central section of the sheet such that opposing ends of the sheet align parallel with one another forming an arched section at the central region where the opposing ends join together, the opposing ends attached to the convex outer surface and comprising a curved profile that matches a curvature of the convex outer surface of the semi-circular band, wherein a void is formed between the coupling mechanism and the convex outer surface, the opposing ends extending radial outwards from the semi-circular band such that the void is bounded by the arched section, the opposing ends, and the semi-circular band; and
fastening the second three-sided bracket to another end of the semi-circular band by attaching the second curved sections to the convex outer surface of the semi-circular band.

18. The method of claim 16, wherein attaching the curved sections to the convex outer surface of the semi-circular band comprises welding the curved sections to the convex outer surface of the semi-circular band.

19. The method of claim 16, wherein forming the coupling mechanism blank into the three-sided bracket defines a saddle shape region on one of the three sides of the three-sided bracket.

20. The method of claim 19, further comprising forming a half-barrel nut configured to slide in the saddle shaped region responsive to tightening the clamp assembly.

21. The method of claim 20, wherein forming the half-barrel nut comprises:
obtaining a bar stock having an outer diameter corresponding to an inner diameter of the saddle shaped region;
halving the bar stock;
responsive to halving the bar stock, forming a length of semi-circular shaped bar stock having a curved portion and a flat portion;
dividing the length of semi-circular shaped bar stock into sections, each section having a length corresponding to an outer dimension defined by an outer surfaces of the saddle shaped region; and
boring a void from the flat portion to the curved portion.

22. The method of claim 21, wherein the void is at least one of a threaded void or a smooth void.

23. The method of claim 22, further comprising:
obtaining a plurality of washers;
placing one washer proximate one half-barrel nut having the threaded void in the saddle shaped region of one coupling mechanism;
placing another washer proximate one half-barrel nut having the smooth void in the saddle shaped region of the another coupling mechanism;
passing a fastener through the one washer and the half-barrel nut having the smooth void in the saddle shaped region;
passing the fastener through the another washer;
threading the fastener into the half-barrel nut having the threaded void in the saddle shaped region;
responsive to threading the fastener into the half-barrel nut having the threaded void in the saddle shaped region, the clamp assembly placed about the end cap positioned on an end of the pump body, tightening the clamp assembly; and
responsive to tightening the clamp assembly, sealing the end cap to the pump body.

* * * * *